US006831938B1

United States Patent
Gunn, III

(10) Patent No.: US 6,831,938 B1
(45) Date of Patent: Dec. 14, 2004

(54) OPTICAL SYSTEM USING ACTIVE CLADDING LAYER

(75) Inventor: Lawrence Cary Gunn, III, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 55 days.

(21) Appl. No.: 09/649,969

(22) Filed: Aug. 28, 2000

Related U.S. Application Data
(60) Provisional application No. 60/151,331, filed on Aug. 30, 1999.

(51) Int. Cl.[7] .............................. H01S 3/08; H01S 3/06; H01S 3/083
(52) U.S. Cl. ............................................. 372/92; 67/94
(58) Field of Search ............................... 372/67, 92–109

(56) References Cited

U.S. PATENT DOCUMENTS

| | | | | |
|---|---|---|---|---|
| 4,852,117 A | * | 7/1989 | Po ............................ 372/97 |
| 4,899,042 A | * | 2/1990 | Falk et al. ............. 250/227.19 |
| 5,018,857 A | * | 5/1991 | Sanders et al. ............. 356/350 |
| 5,125,066 A | * | 6/1992 | Ishiguro ...................... 385/142 |
| 5,274,720 A | * | 12/1993 | Yamamoto ................... 385/129 |
| 5,343,490 A | * | 8/1994 | McCall ......................... 372/94 |
| 5,377,285 A | * | 12/1994 | Podgorski ..................... 385/27 |
| 5,398,256 A | * | 3/1995 | Hohimer et al. .............. 372/94 |
| 5,742,633 A | * | 4/1998 | Stone et al. ................... 372/92 |
| 5,790,583 A | * | 8/1998 | Ho ............................... 372/92 |
| 5,825,799 A | * | 10/1998 | Ho et al. ....................... 372/92 |
| 5,878,070 A | * | 3/1999 | Ho et al. ....................... 372/92 |
| 5,926,496 A | * | 7/1999 | Ho et al. ....................... 372/92 |
| 5,933,271 A | * | 8/1999 | Waarts et al. ............... 359/341 |
| 6,009,115 A | * | 12/1999 | Ho ............................... 372/92 |
| 6,052,495 A | * | 4/2000 | Little et al. ..................... 385/2 |
| 6,208,678 B1 | * | 3/2001 | King ............................ 372/72 |
| 6,295,161 B1 | * | 9/2001 | Bazzocchi ............. 359/341.33 |
| 6,297,707 B1 | * | 10/2001 | Martheli et al. .............. 331/96 |
| 6,400,856 B1 | * | 6/2002 | Chin ............................ 385/11 |
| 6,411,752 B1 | * | 6/2002 | Little et al. ................... 385/17 |
| 6,473,218 B1 | * | 10/2002 | Maleki et al. .............. 359/245 |
| 6,580,851 B1 | * | 6/2003 | Vahala et al. ................. 385/30 |

* cited by examiner

*Primary Examiner*—Don Wong
*Assistant Examiner*—Phillip Nguyen
(74) *Attorney, Agent, or Firm*—Fish & Richardson P.C.

(57) ABSTRACT

An optical resonator is described which includes an active cladding material, the active cladding material enabling optical amplification.

22 Claims, 2 Drawing Sheets

OPTICAL SYSTEM USING ACTIVE CLADDING LAYER

This application claims the benefit of U.S. Provisional Application No. 60/151,331 filed on Aug. 30, 1999.

BACKGROUND

It is known to use optical resonators and fibers for many purposes.

Optical resonators can take many different shapes including Bragg reflective waveguide cavities, Fabry-Perot cavities, ring resonators, and disk resonators. Each of these elements includes a resonant cavity which supports wavelength dependent resonance—the ability to constructively interfere with the optical energy of the resonant wavelength. Once optical energy of the specified resonant wavelength, e.g., light, is coupled into the cavity, the light may remain in the cavity and move over long distances within the cavity in random directions.

SUMMARY

The present application teaches a special kind of optical resonator which includes an "active" cladding, causing optical amplification.

In a preferred embodiment, optically active cladding components are added to optical components, e.g., integrated waveguides and optical resonator structures. Applications may include optical filtering, optical switching, and optical amplification.

BRIEF DESCRIPTION OF THE DRAWINGS

These and other aspects will now be described in detail with reference to the accompanying drawings wherein.

DETAILED DESCRIPTION

Figure 1:
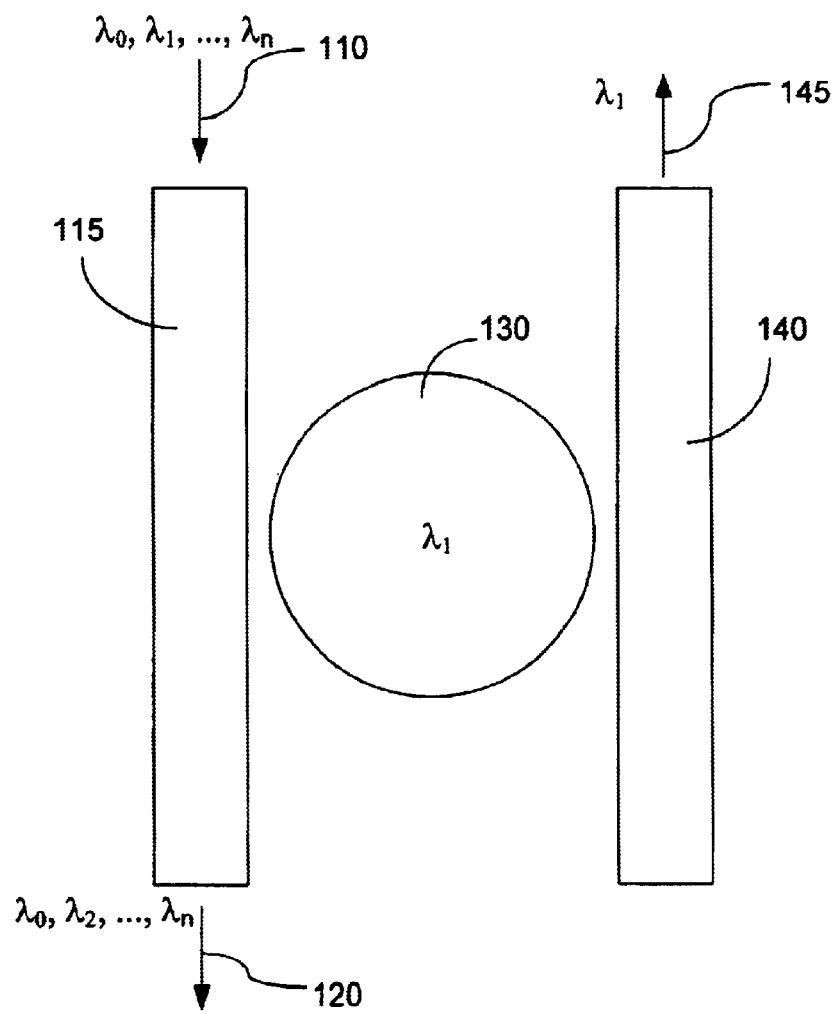
FIG. 1 shows a disk resonator being used as a filter.

FIG. 1 shows a resonator being used as an optical element with an adjacent waveguide. While any resonator can be used, as noted above, the detailed description specifically refers to a disk resonator, which may be considered as one preferred way to make this system, due to its ease of manufacture and use. It should be understood that the term "resonator" as used herein, however, refers to any of the resonators referred to above.

FIG. 1 shows a disk resonator being used as a routing/amplification element. Light in 110 includes a plurality of wavelengths $\lambda_{01}, \lambda_{02}, \lambda_{03}, \lambda_{04} \ldots \lambda_n$. The light in 110 is coupled to an optical waveguide 115 that passes the light. The light out 120 has different characteristics than the light in. In the shown embodiment, the resonator 130 is resonant with the frequency $\lambda_1$ and thereby forms a filter for $\lambda_1$. A second waveguide 140 is placed in proximity with the resonator 130. The waveguide 140 produces a light output 145 corresponding to filtered out $\lambda_1$. The light output 120 of the first waveguide 110 includes all of the frequencies except $\lambda_1$.

If the power losses in the resonator and fiber are ignored, then the output power of the second waveguide is the same as the power coupled out of the original waveguide for that wavelength. Of course, some losses always occur. Loss mechanisms include insertion losses, waveguide and cladding material absorption losses, surface scattering losses, and device geometry induced coupling and scattering losses.

Figure 2:
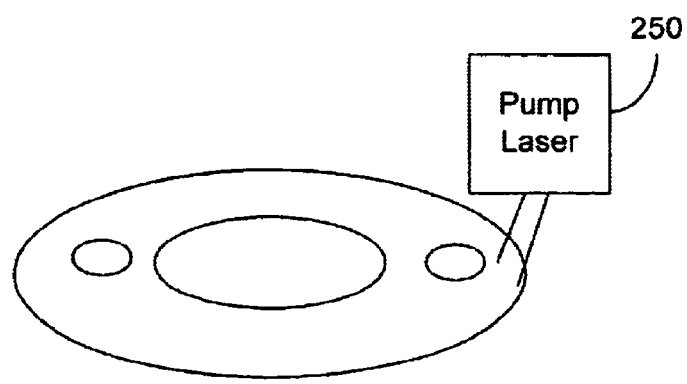
FIG. 2 shows a cross-sectional view of a disk resonator being used with an optically active cladding.

According to the present system, gain is added to the resonator system. FIG. 2 shows how the gain is added. The resonator 130 is modified to include an active cladding system 135. An exemplary active cladding system may be an erbium doped silicon dioxide material 210. The erbium doped dioxide is pumped with a pump laser to cause amplification using known effects.

The waveguide structure itself can be any material that has a higher index of refraction than the cladding. The waveguide structure must also be transparent to wavelengths that are produced in the active cladding. In the specific material example that is given, an erbium doped cladding could be used with a semiconductor material, such as a silicon or gallium arsenide waveguide. The waveguide core material which is used does not need to be optically active. Since a semiconductor material can therefore be used for the optical part, other silicon processing techniques can be used on that material. The silicon, for example, can include active microelectronic structures, or can be processed by micro-machining techniques.

The cladding region requires a gain medium of sufficient length to allow optical gain. A pump source 250 for the gain medium 240 is also necessary. It is known to use erbium doped fiber amplifiers. Erbium doped fiber amplifiers may be pumped with 980 nanometer or 1480 nanometer light. These pumping devices must be relatively long, usually about one meter, in order for the light to effectively interact with the erbium-doped material. While this is still one option, the way that a resonator operates can be used to allow operation without requiring quite so long an overlap. In the integrated optics domain, gain can be added to the resonant cavities, thereby taking advantage of the increased effective path length due to the high Qs of the resonator. In this way, the interaction of the light with the amplification medium is increased. This is done by forming an active cladding layer on the resonator waveguide surface and thereby introducing a cladding based gain medium to the resonator, in order to amplify the resonant light.

Another factor which needs to be addressed is the gain of the optical amplifier. When an active waveguide core is used, this gain is dependent on the confinement factor of the waveguiding material. For example, the gain may be proportional to the power that is contained in the cladding. This proportionality, however, may be non-linear, However, the gain of the waveguide structures may also be dependent on factors that determine the amount of power in the cladding such as geometry and refractive index of the material. The active resonator which includes gain therein. This may have different applications which are described herein. These applications may also vary depending on the amount of gain which is provided by the doping. There is a certain threshold gain which can be determined by experimentation. Below that gain, the amount of amplification that occurs may not be useful for many purposes. Above the threshold, however, the active material may spontaneously emit light. This can bootstrap the cavity to an appropriate photon density which produces stimulated emission. The stimulated emission may be analogous to lazing, hence forming a laser cavity from an optical resonator. However, below the threshold, effects may also be useful for filtering optical signals, e.g., forming an add/drop system only to the frequency of interest to a specific waveguide. Unlike other systems, this system can use semiconductor materials. Since an optically inactive material such as silicon may be used for the core waveguide, this provides flexibility in the kinds of material that can be used in both over the threshold and under the threshold applications.

Figure 3:
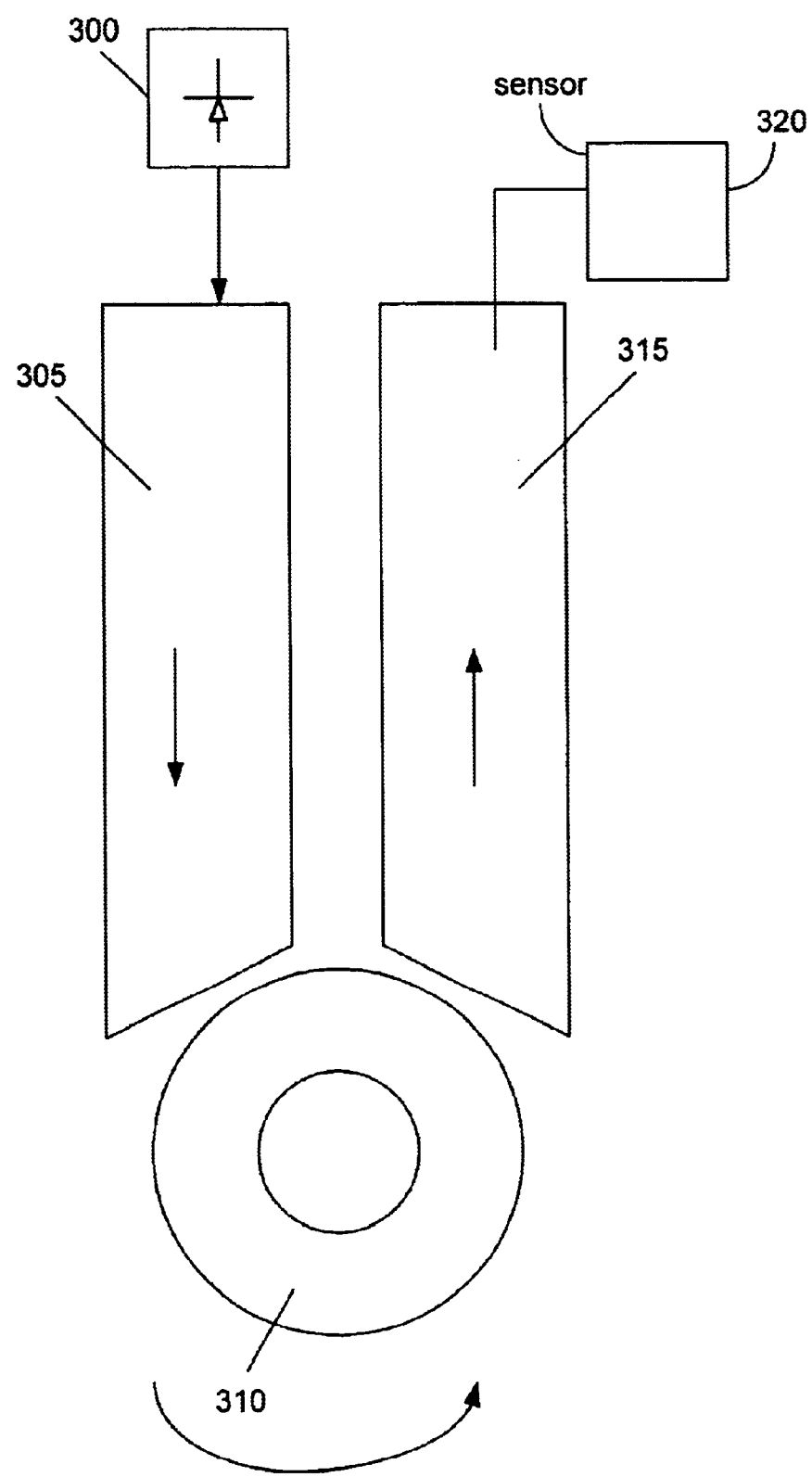
FIG. 3 shows the system configured as a rotation detector.

Yet another application is in rotation sensing as shown in FIG. 3. The Sagnac effect as used in a ring laser gyroscope relies on the interference of counter propagating beams. A resonator 310, such as a disk resonator, is driven as described above operate over the lazing threshold. Light from source 300 is coupled via waveguide 305 to form counter-propagating light in many different directions within the resonator 310. If the disk is rotated, the counter propagating light will interfere based on the rotation according to the Sagnac affect. The rate of rotation can then be sensed as a function of the intensity coupled out of the resonator to the adjacent waveguide 315, and a sensing element 320.

Another rotation sensor can be formed based on the wavelength dependence of the resonator. When the resonator is operated as a filter, its wavelength dependence will vary based on rotation. In this embodiment, source 300 is a frequency tuned stabilized light source. The intensity of the coupled light then varies as a function of the rotation of the resonator. If the light source has a smaller line width in the passband of the filter, and is slightly detuned, the response in the positive and negative direction can be made linear.

Another embodiment uses the same feature without an active cladding. However, in this alternative embodiment without the active cladding, the gain may be small.

Yet another embodiment uses a partially coupled concentric ring resonator. This effect is even further enhanced by this system, since a longer path length and longer cavity photon lifetime is provided. Some phase modulation or tuning of the effective length may be necessary in this system.

Although only a few embodiments have been disclosed in detail above, other modifications are possible. For example, although we have only described certain resonators, other resonators are also possible. Other materials can be used as the active layer. In addition, other applications of the laser system may be predictable.

All such modifications are intended to be encompassed within the following claims.

What is claimed is:

1. A device, comprising an optical disk-shaped resonator, which is in the shape of a disc, formed of a silicon core portion in a silicon material, and a cladding layer surrounding said silicon core portion, said cladding layer made of an optically active material, and configured to amplify optical energy that is guided in said silicon core portion, and said silicon material fabricated to include a microelectronic structure.

2. A device as in claim 1, further comprising a pump laser, optically pumping said cladding layer.

3. A device as in claim 2 wherein said cladding layer is an erbium doped portion of material.

4. A device as in claim 1 wherein said optically active material is made of a semiconductor material.

5. A device as in claim 1 further comprising a pumping laser which pump the cladding layer to cause lasing at a resonant wavelength in said silicon core.

6. A method of amplifying light, comprising:
introducing light into an inactive silicon waveguide core of an optical disk shaped resonator which has an optically active waveguide cladding for said inactive silicon waveguide core; and
optically pumping the optically active waveguide cladding to amplify the light guided in said inactive silicon waveguide core in the optical disk shaped resonator.

7. A method as in claim 6 wherein said waveguide core and said waveguide cladding are configured to cause a high confinement factor in said waveguide cladding to achieve a high optical gain in amplifying the light.

8. A method as in claim 6 wherein said amplifying comprises using a pump laser to pump a doping in a core portion of the optical resonator.

9. A laser comprising an optical disk shaped resonator, formed of an inactive core material surrounded by an active cladding material operable to amplify optical energy that is guided in said inactive core material, and a pump laser which drives said active cladding material until lasing occurs in said optical resonator.

10. A device as in claim 1, wherein said optically active material for the said cladding layer comprises a dielectric material doped to produce optical gain at a resonant wavelength of said disk-shaped resonator.

11. A device as in claim 10, wherein said dielectric material comprises silicon dioxide.

12. A device as in claim 10, wherein said dielectric material is doped with erbium.

13. A method, comprising:
introducing light into an inactive silicon waveguide core of an optical ring resonator which has an optically active waveguide cladding for the inactive silicon waveguide core;
optically pumping the waveguide cladding to amplify resonant light guided in the optical ring resonator;
rotating the optical ring resonator; and
measuring an optical output of the optical ring resonator to determine a rate of rotation of the optical ring resonator.

14. A method as in claim 13, wherein the measurement of the optical output is a measurement of an intensity of light caused by interference of counter propagating beams in the optical ring resonator.

15. A method as in claim 13, further comprising using a phase modulation in measuring the optical output.

16. A method as in claim 13, further comprising tuning an effective length of the optical ring resonator in measuring the optical output.

17. A method as in claim 13, wherein the measurement of the optical output includes measuring a wavelength dependence in the optical output on the rate of the rotation.

18. A device, comprising:
a semiconductor material fabricated to comprise a waveguide core and a microelectronic structure;
a waveguide cladding surrounding said waveguide core to form a waveguide resonator said waveguide cladding made of an optically active dielectric material to amplify resonant light guided in said waveguide core when optically pumped by a pump beam; and
a pump source to produce the pump beam to said waveguide cladding.

19. A device as in claim 18, wherein the semiconductor material is silicon.

20. A device as in claim 18, wherein the optically active dielectric material comprises doped silicon dioxide.

21. A device as in claim 20, wherein said doped silicon dioxide comprises erbium.

22. A device as in claim 18, wherein the pump beam is resonant in said waveguide resonator to increase an effective overlap length with the resonant light being amplified.

* * * * *